United States Patent
Jun et al.

(10) Patent No.: US 9,633,794 B2
(45) Date of Patent: Apr. 25, 2017

(54) CAPACITOR MODULE OF INVERTER FOR VEHICLE

(71) Applicant: Hyundai Motor Company, Seoul (KR)

(72) Inventors: Chang Han Jun, Gyeonggi-do (KR);
Seung Hyun Han, Gyeonggi-do (KR);
Jeong Yun Lee, Gyeonggi-do (KR); Ho Tae Chun, Daejeon (KR)

(73) Assignee: Hyundai Motor Company, Seoul (KR)

( * ) Notice: Subject to any disclaimer, the term of this patent is extended or adjusted under 35 U.S.C. 154(b) by 111 days.

(21) Appl. No.: 14/845,500

(22) Filed: Sep. 4, 2015

(65) Prior Publication Data

US 2016/0172111 A1    Jun. 16, 2016

(30) Foreign Application Priority Data

Dec. 16, 2014  (KR) .......................... 10-2014-0181780

(51) Int. Cl.
*H01G 4/38* (2006.01)

(52) U.S. Cl.
CPC ...................................... *H01G 4/38* (2013.01)

(58) Field of Classification Search
CPC ........................................................ H01G 4/38
See application file for complete search history.

(56) References Cited

U.S. PATENT DOCUMENTS

| 9,107,319 B2 | 8/2015 | Jeong et al. |
| 2004/0257841 A1 | 12/2004 | Taguchi et al. |
| 2011/0094075 A1 | 4/2011 | Lee et al. |
| 2014/0085772 A1* | 3/2014 | Oh ..................... H05K 1/0231 361/329 |
| 2014/0085835 A1* | 3/2014 | Berry ..................... H01G 2/16 361/748 |
| 2014/0168869 A1 | 6/2014 | Jeong et al. |

FOREIGN PATENT DOCUMENTS

| JP | 2007-012769 A | 1/2007 |
| JP | 2013-059158 A | 3/2013 |
| JP | 2014-121260 A | 6/2014 |
| KR | 10-2011-0045112 A | 5/2011 |
| KR | 10-2014-0073715 A | 6/2014 |

OTHER PUBLICATIONS

Jun, Chang Han et al., "The Design Method of Y-Capacitor Reducing CM-Noise in HV Inverter-Motor System", Hyundai Motor Group Conference. Sep. 18, 2014.

* cited by examiner

*Primary Examiner* — Dion R Ferguson
(74) *Attorney, Agent, or Firm* — Mintz Levin Cohn Ferris Glovsky and Popeo, P.C.; Peter F. Corless

(57) ABSTRACT

A capacitor module of an inverter for a vehicle includes: a DC-link capacitor configured to be connected in parallel to an input of an inverter between a first high voltage input terminal and a second high voltage input terminal; and a plurality of Y-capacitors configured to be connected in parallel to the inverter. Each of the plurality Y-capacitors includes a first capacitor element connected between the first high voltage input terminal and a ground bus bar and a second capacitor element connected between the second high voltage input terminal and the ground bus bar, and the ground bus bars of the plurality of Y-capacitors are separately provided and the ground holes of the ground bus bars are disposed so as to face each other in a first direction.

5 Claims, 5 Drawing Sheets

CAPACITOR MODULE OF INVERTER FOR VEHICLE

CROSS-REFERENCE TO RELATED APPLICATION

This application is based on and claims the benefit of priority to Korean Patent Application No. 10-2014-0181780, filed on Dec. 16, 2014 in the Korean Intellectual Property Office, the disclosure of which is incorporated herein in its entirety by reference.

TECHNICAL FIELD

The present disclosure relates to a capacitor module of an inverter for a vehicle, and more particularly, to a capacitor module of an inverter for a vehicle including a plurality of Y-capacitors connected to an input of the inverter.

BACKGROUND

A hybrid vehicle means a vehicle that is driven by combining two or more different kinds of power sources. The hybrid vehicle having a meaning which is generally used is a vehicle driven by an engine obtaining torque by burning fuel and an electric motor obtaining torque from power of a battery.

In the hybrid vehicle, in order to drive the motor, a high voltage source for supplying power required to drive the motor while repeating a charging and a discharging during the driving of the vehicle, and an inverter for rotating the motor using the power of the battery are required.

In the case in which the inverter-motor system as described above is driven, since noise may occur, a capacitor module for minimizing the noise is required.

SUMMARY

The present disclosure has been made to solve the above-mentioned problems occurring in the prior art while advantages achieved by the prior art are maintained intact.

An aspect of the present disclosure provides a capacitor module of an inverter for a vehicle capable of effectively reducing AM band common mode conduction noise occurring when a motor is driven by the inverter, by connecting Y-capacitors in parallel with a DC high voltage input terminal.

An aspect of the present disclosure also provides a capacitor module of an inverter for a vehicle capable of minimizing parasitic components by optimizing paths from a P(+) terminal and an N(−) terminal of the high voltage input terminal to a ground bus bar through the respective Y-capacitors.

The aspects of the present disclosure are not limited to the aspects described above, and other aspects that are not described above may be clearly understood by those skilled in the art from the following description.

According to an exemplary embodiment of the present disclosure, a capacitor module of an inverter for a vehicle includes: a DC-link capacitor configured to be connected in parallel to an input of an inverter between a first high voltage input terminal and a second high voltage input terminal; and a plurality of Y-capacitors configured to be connected in parallel to the inverter, wherein each of the plurality Y-capacitors includes a first capacitor element connected between the first high voltage input terminal and a ground bus bar and a second capacitor element connected between the second high voltage input terminal and the ground bus bar, and the ground bus bars of the plurality of Y-capacitors are separately provided and the ground holes of the ground bus bars are disposed so as to face each other in a first direction.

The first capacitor elements of the respective Y-capacitors may be disposed so as to be adjacent to each other, and the second capacitor elements of the respective Y-capacitors may be disposed so as to be adjacent to each other. For example, the first capacitor element and the second capacitor element of one Y-capacitor may be disposed so as to alternate with the first capacitor element and the second capacitor element of another Y-capacitor.

At least one of the ground holes of the ground bus bars may be disposed at the same side as the first and second high voltage input terminals, and the capacitor elements may be disposed along the first direction. For example, the ground holes of the ground bus bars disposed at the same side as the first and second high voltage input terminals may be disposed so as to be adjacent to the high voltage input terminals.

In the plurality of Y-capacitors, a path from the first high voltage input terminal to the ground hole of the ground bus bar via the first capacitor element and a path from the second high voltage input terminal to the ground hole of the ground bus bar via the second capacitor element may be the same as each other.

As summations of the paths from the high voltage input terminals of the respective Y-capacitors to the ground holes of the ground bus bars via the capacitor elements are the same as each other, parasitic parameter components of the Y-capacitors may be the same as each other, thereby making it possible to minimize an affect due to resonance of the Y-capacitors.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
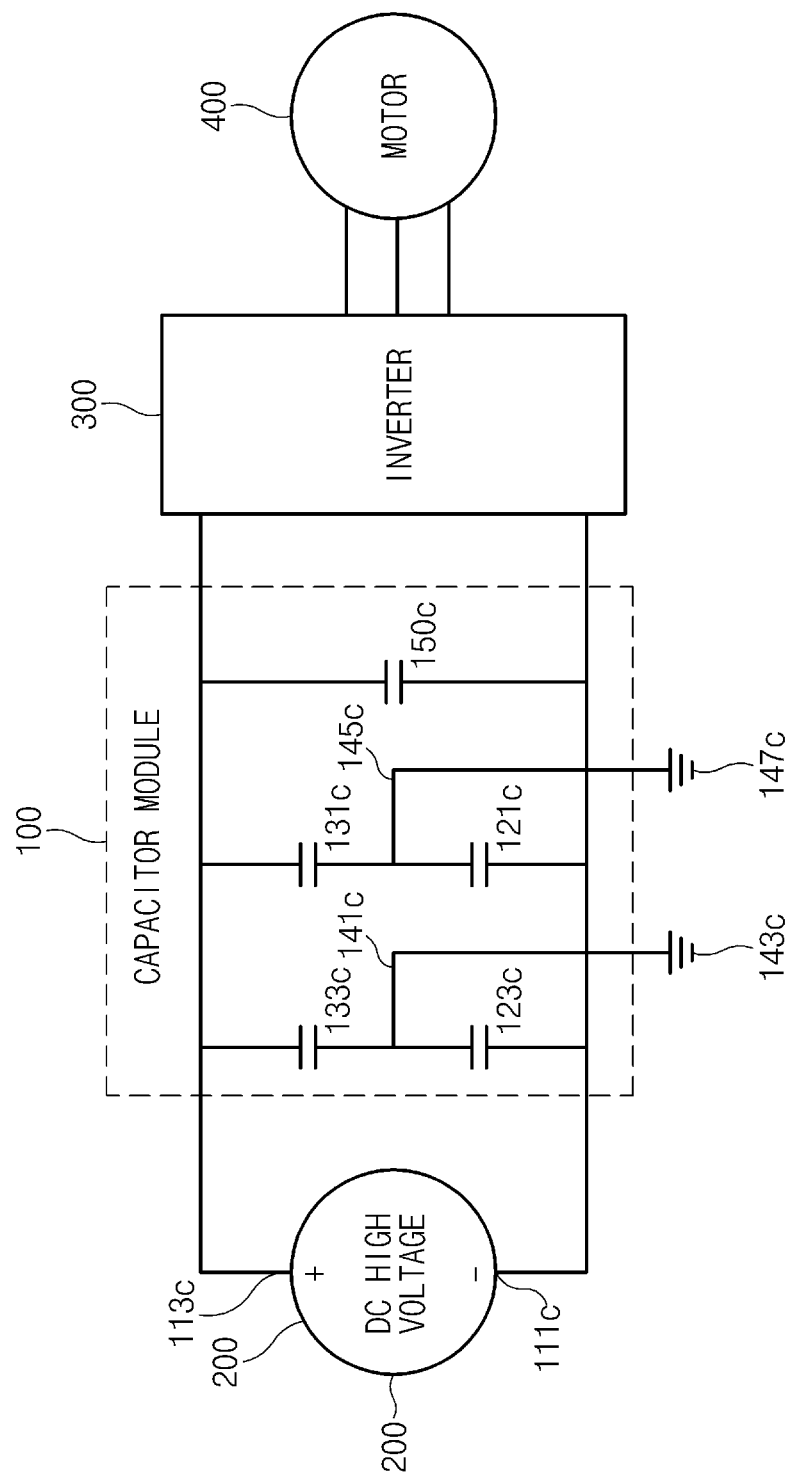
FIG. 1 is a circuit diagram showing an inverter-motor system and a capacitor module of an inverter for a vehicle connected in parallel to an input side of the inverter, according to an exemplary embodiment of the present disclosure.

Hereinafter, exemplary embodiments of the present disclosure will be described in detail with reference to the accompanying drawings. Throughout the accompanying drawings, the same components will be denoted by the same reference numerals, and an overlapped description thereof will be omitted.

In exemplary embodiments of the present disclosure disclosed in the present specification, specific structural and functional descriptions are only to describe exemplary embodiments of present disclosure, and exemplary embodiments of the present disclosure may be implemented in various forms and are not to be interpreted to be limited to exemplary embodiments described in the present specification.

In addition, in describing the components of the present disclosure, terms such as first, second, A, B, etc. can be used. These terms are used only to differentiate the components from other components. Therefore, the nature, order, sequence, etc. of the corresponding components are not limited by these terms.

FIG. 1 is a circuit diagram showing an inverter-motor system and a capacitor module of an inverter for a vehicle connected in parallel to an input side of the inverter, according to an exemplary embodiment of the present disclosure.

Referring to FIG. 1, an inverter-motor system may include a capacitor module 100 of an inverter for a vehicle, a DC high voltage 200, an inverter 300, and a motor 400.

The DC high voltage 200 supplies a voltage to the inverter 300 by applying high voltages having different polarities to a first high voltage input terminal 111c and a second high voltage input terminal 113c.

The capacitor module 100 of the inverter for the vehicle is connected in parallel to an input of the inverter 300 between the first high voltage input terminal 111c and the second high voltage input terminal 113c. The capacitor module 100 of the inverter for the vehicle may include a DC-link capacitor 150c and a plurality of Y-capacitors that suppress variation in a voltage and a current by absorbing a high power ripple current occurring at the time of switching.

Although the present specification shows that the capacitor module 100 of the inverter for the vehicle includes two Y-capacitors connected in parallel to each other for convenience of explanation and provides a description based on that as shown, the present disclosure is not limited thereto. For example, the capacitor module 100 of the inverter for the vehicle according to the present disclosure may include two or more Y-capacitors connected in parallel to each other.

A first Y-capacitor may include a first capacitor element 123c connected between the first high voltage input terminal 111c and a ground 141c, 143c and a second capacitor element 133c connected between the second high voltage input terminal 113c and the ground 141c, 143c. Although a description will be provided with reference to FIGS. 2 to 4, the ground 141c, 143c structurally includes a ground bar 141c and a ground hole 143c. However, since the two structures are the same in terms of a circuit concept, they will be described in FIG. 1 without being classified.

A second Y-capacitor may include a third capacitor element 121c connected between the first high voltage input terminal 111c and a ground 145c, 147c and a fourth capacitor element 131c connected between the second high voltage input terminal 113c and the ground 145c, 147c.

The inverter 300 drives the motor 400 based on the high voltage provided through the capacitor module 100 of the inverter for the vehicle.

The capacitor module 100 of the inverter for the vehicle according to the exemplary embodiment of the present disclosure may reduce insertion loss of a filter by including the plurality of Y-capacitors connected in parallel to each other.

Figure 2:
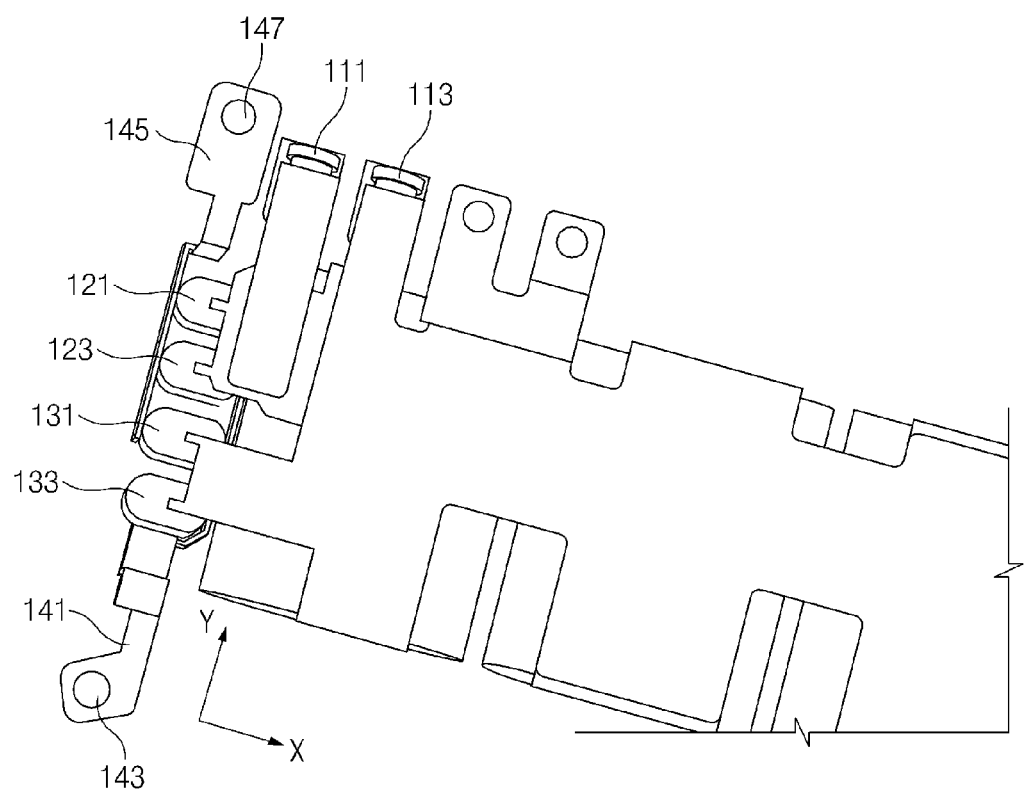
FIG. 2 is a perspective view in a first direction of the capacitor module of the invertor according to an exemplary embodiment of the present disclosure.
Figure 3:
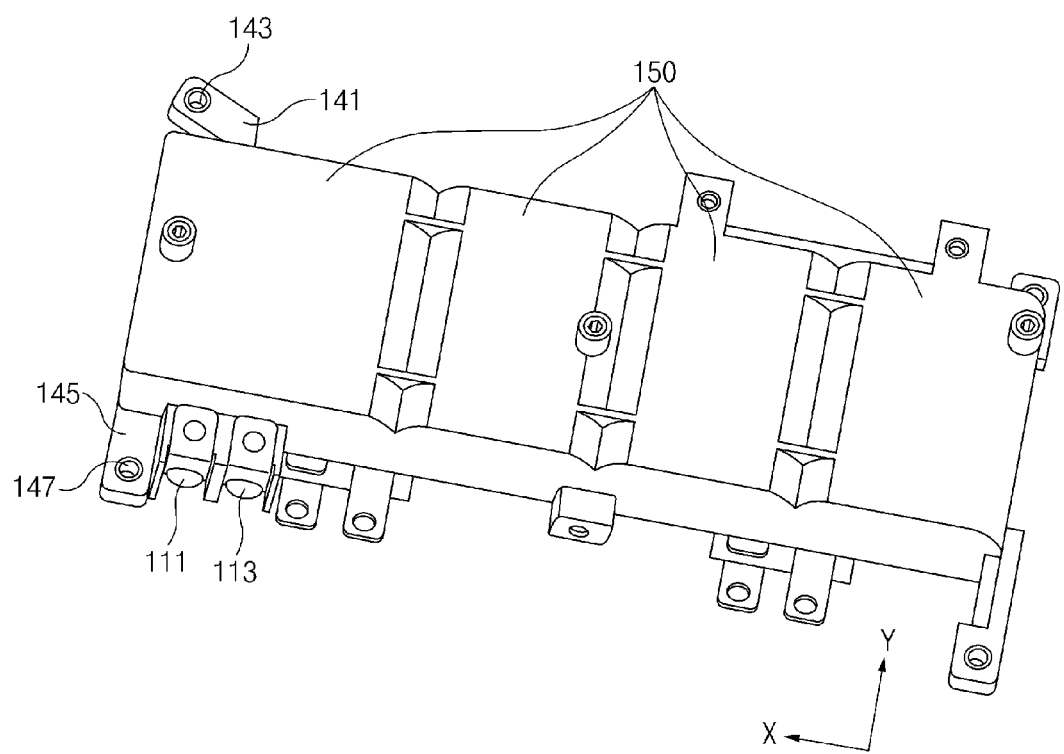
FIG. 3 is a perspective view in a second direction of the capacitor module of the inverter for the vehicle according to an exemplary embodiment of the present disclosure that are viewed from different directions.

FIGS. 2 and 3 are perspective views of the capacitor module of the inverter for the vehicle according to an exemplary embodiment of the present disclosure that are viewed from different directions.

Figure 4:
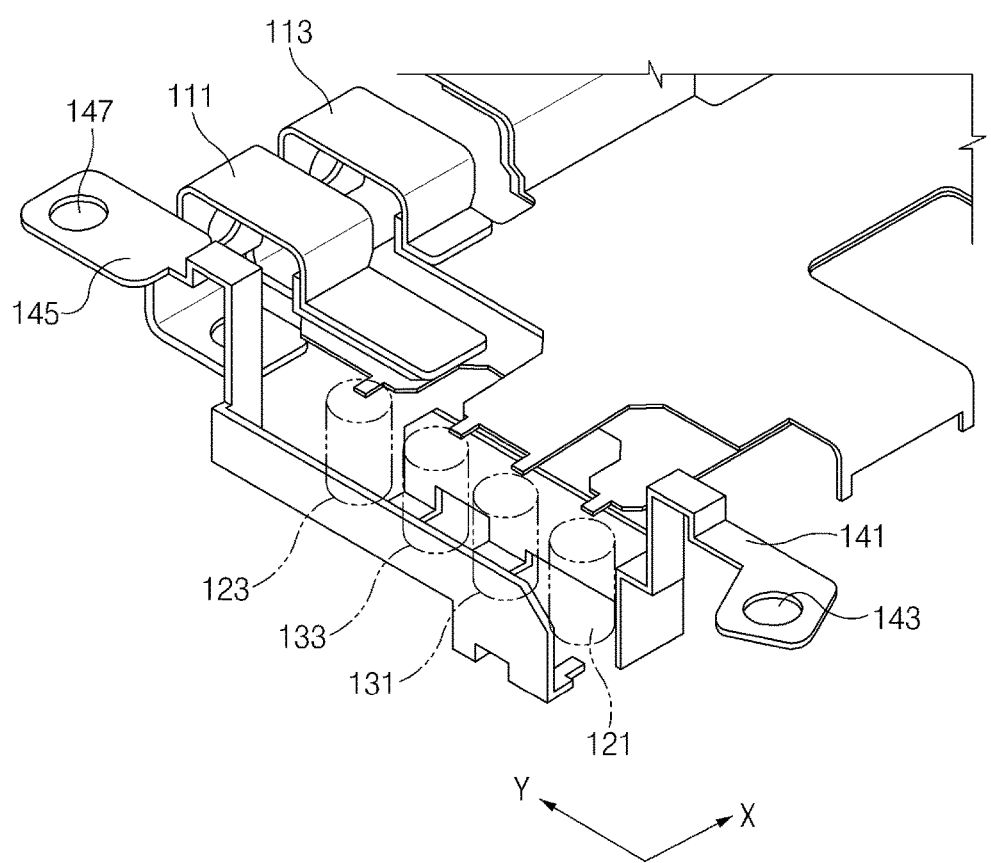
FIG. 4. is an exploded perspective view showing a capacitor module of an inverter for a vehicle according to an exemplary embodiment of the present disclosure.

In FIG. 1, alphabet 'c' is put after reference numerals in order to denote circuit elements. In FIGS. 2 to 4, reference numerals that the alphabet 'c' is omitted from the circuit diagram of FIG. 1 will be used to indicate the same component as those of FIG. 1. Like reference numerals denote like components in the respective drawings.

Referring to FIG. 2, the first high voltage input terminal 111c and the second high voltage input terminal 113c are disposed so as to be adjacent to each other in a direction extended from one side of the capacitor module 100 of the inverter for the vehicle to an X direction.

A first Y-capacitor may include a first capacitor element 123 connected between a first high voltage input terminal 111 and a ground hole 143 of a first ground bus bar 141 and a second capacitor element 133 connected between a second high voltage input terminal 113 and the ground hole 143 of the first bus bar 141.

A second Y-capacitor may include a third capacitor element 121 connected between the first high voltage input terminal 111 and a ground hole 147 of a second ground bus bar 145 and a fourth capacitor element 131 connected between the second high voltage input terminal 113 and the ground hole 147 of the second ground bus bar 145.

According to the present disclosure, the plurality of Y-capacitors connected in parallel to each include separate ground bus bars 141 and 145. The respective ground bus bars 141 and 145 may be extended in a Y direction, and the ground holes 143 and 147 thereof may face each other in the Y direction.

In addition, the plurality of capacitor elements 121, 123, 131, and 133 may be disposed in the Y direction between the ground holes 143 and 147 in a direction in which the ground holes 143 and 147 face each other.

The ground hole of at least one ground bus bar among the plurality of Y-capacitors may be disposed at the same side as the high voltage input terminals 111 and 113 and may be disposed so as to be adjacent to the high voltage input terminals 111 and 113. In FIG. 2, the ground hole 147 of the second ground bus bar 145 is disposed so as to be adjacent to the first high voltage input terminal 111 in the X direction.

In the case in which the ground hole 147 of the second ground bus bar 145 is disposed so as to be adjacent to the high voltage input terminals 111 and 113, parasitic inductance components formed from the high voltage input terminals 111 and 113 to the ground hole 147 of the second ground bus bar 145 via the third and fourth capacitor elements 121 and 131 may be minimized. Therefore, an insert loss effect of the filter for common mode noise is increased.

In the plurality of Y-capacitors, a path from the first high voltage input terminal 111 to the ground hole 143 of the first ground bus bar 141 via the first capacitor element 123 and a path from the first high voltage input terminal 111 to the ground hole 147 of the second ground bus bar 145 via the third capacitor element 121 may be the same as each other.

In addition, a path from the second high voltage input terminal 113 to the ground hole 143 of the first ground bus bar 141 via the second capacitor element 133 and a path from the second high voltage input terminal 113 to the ground hole 147 of the second ground bus bar 145 via the fourth capacitor element 131 may also be the same as each other.

For example, in order that the distances from first capacitor element 123 and the third capacitor element 121 connected to the first high voltage input terminal 111, and the second capacitor element 133 and the fourth capacitor element 131 connected to the second high voltage input terminal 113, to the ground holes thereof are the same as each other, the capacitor elements connected to the same high voltage input terminal need to be disposed so as to be adjacent to each other.

Further, a summation of the path from the first high voltage input terminal 111 to the ground hole 143 of the first ground bus bar 141 via the first capacitor element 123 and the path from the second high voltage input terminal 113 to the ground hole 143 of the first ground bus bar 141 via the second capacitor element 133 and a summation of the path from the first high voltage input terminal 111 to the ground hole 147 of the second ground bus bar 145 via the third capacitor element 121 and the path from the second high voltage input terminal 113 to the ground hole 147 of the second ground bus bar 145 via the fourth capacitor element 131 may be the same as each other.

By balancing the paths of the Y-capacitors connected in parallel to each other as described above, parasitic parameters ESL and ESR may be the same as each other and resonance due to parasitic inductance unbalance may be suppressed.

In addition, according to an exemplary embodiment of the present disclosure, in order that the paths from the Y-capacitors connected in parallel to each other to the ground holes of the respective ground bus bars are the same as each other, the first to fourth capacitor elements 123, 133, 121, and 131 disposed so as to be adjacent to each other along the Y direction may be alternately disposed. In other words, the first capacitor element 123 and the second capacitor element 133 connected to the first ground bus bar 141, and the third capacitor element 121 and the fourth capacitor element 131 connected to the second ground bus bar 145 may be alternately disposed.

FIG. 4 is an exploded perspective view showing a capacitor module of an inverter for a vehicle according to another exemplary embodiment of the present disclosure.

Referring to FIG. 4, unlike those shown in FIGS. 2 and 3, the first capacitor element 123 and the second capacitor element 133 are disposed so as to be adjacent to each other, and the fourth capacitor element 131 and the third capacitor element 121 may be disposed so as to be adjacent to each other.

Although being disposed as shown in FIG. 4, the path from the first high voltage input terminal 111 to the ground hole 143 of the first ground bus bar 141 via the first capacitor element 123 and the path from the first high voltage input terminal 111 to the ground hole 147 of the second ground bus bar 145 via the third capacitor element 121 may be the same as each other.

In addition, the path from the second high voltage input terminal 113 to the ground hole 143 of the first ground bus bar 141 via the second capacitor element 133 and the path from the second high voltage input terminal 113 to the ground hole 147 of the second ground bus bar 145 via the fourth capacitor element 131 may also be the same as each other.

Further, the summation of the path from the first high voltage input terminal 111 to the ground hole 143 of the first ground bus bar 141 via the first capacitor element 123 and the path from the second high voltage input terminal 113 to the ground hole 143 of the first ground bus bar 141 via the second capacitor element 133 and the summation of the path from the first high voltage input terminal 111 to the ground hole 147 of the second ground bus bar 145 via the third capacitor element 121 and the path from the second high voltage input terminal 113 to the ground hole 147 of the second ground bus bar 145 via the fourth capacitor element 131 may be the same as each other.

In the capacitor module of the inverter for the vehicle according to an exemplary embodiment of the present disclosure, capacitance of the Y-capacitor may be selected taking account into the parasitic parameters. The capacitance of the Y-capacitor may be selected so that a resonance frequency of the Y-capacitor may be matched to a band of switching noise occurring when the inverter-motor driving system is driven. Specifically, the capacitance of the Y-capacitor may be selected based on the following Equation 1.

$$f_r = \frac{1}{2\pi\sqrt{(L_{rout} + L_{cap}) \times C}} \quad \text{[Equation 1]}$$

In the above Equation 1, $L_{rout}$ represents path inductance of the Y-capacitor and $L_{cap}$ represents parasitic inductance of the Y-capacitor.

As described above, since the capacitor module of the inverter for the vehicle according to the exemplary embodiment of the present disclosure includes the plurality of Y-capacitors connected in parallel to the inverter, it is possible to reduce the insertion loss of the filter, that is, it is possible to increase a noise reduction effect without moving a filtering band.

Figure 5:
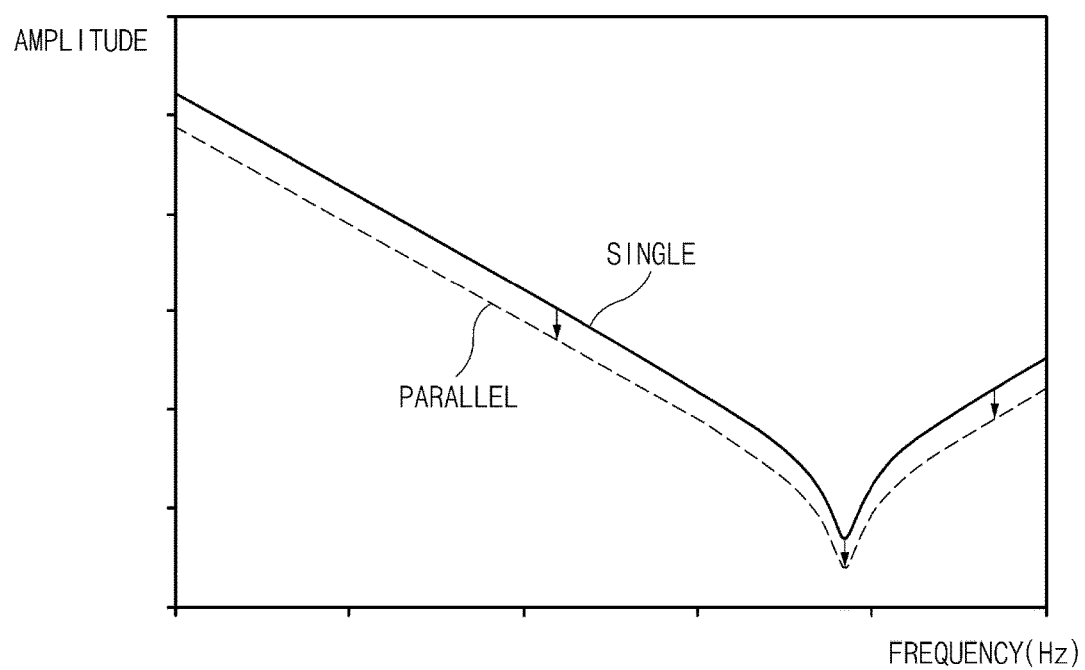
FIG. 5 is a graph illustrating a noise reduction effect of the capacitor module of the inverter for the vehicle according to an exemplary embodiment of the present disclosure.

FIG. 5 is a graph illustrating a noise reduction effect of the capacitor module of the inverter for the vehicle according to an exemplary embodiment of the present disclosure.

Referring to FIG. 5, it may be appreciated that the filtering band is the same, but a noise blocking effect is excellent when the Y-capacitors are connected in parallel, in comparison with the case in which a Y-capacitor is solely connected.

Further, the capacitor module of the inverter for the vehicle according to the exemplary embodiment of the present disclosure may suppress the resonance of the Y-capacitors connected in parallel to each other by an arrangement of the high voltage input terminals, the ground bus bars, and ground holes capable of minimizing parasitic inductance of the Y-capacitors.

As described above, according to the exemplary embodiments of the present disclosure, the capacitor module of the inverter for the vehicle may effectively reduce the noise occurring when the motor is driven using the motor, and an affect of the parasitic components may be minimized by optimally designing the paths from the high voltage input terminal to the ground bus terminal through the Y-capacitors.

The capacitor module of the inverter for the vehicle according to the exemplary embodiments of the present disclosure may reduce the insertion loss of the filter by configuring the Y-capacitors to be in parallel to each other.

Further, the exemplary embodiments of the present disclosure have been provided for illustrative purposes. Therefore, those skilled in the art will appreciate that various modifications, alterations, substitutions, and additions are possible without departing from the scope and spirit of the disclosure as disclosed in the accompanying claims and such modifications, alterations, substitutions, and additions fall within the scope of the present disclosure.

It will be obvious to those skilled in the art to which the present disclosure pertains that the present disclosure described above is not limited to the above-mentioned exemplary embodiments and the accompanying drawings, but may be variously substituted, modified, and altered without departing from the scope and spirit of the present disclosure.

What is claimed is:

1. A capacitor module of an inverter for a vehicle, the capacitor module comprising:
   a DC-link capacitor configured to be connected in parallel to an input of an inverter between a first high voltage input terminal and a second high voltage input terminal; and
   a plurality of Y-capacitors configured to be connected in parallel to the inverter,
   wherein each of the plurality Y-capacitors includes a first capacitor element connected between the first high voltage input terminal and a ground bus bar and a second capacitor element connected between the second high voltage input terminal and the ground bus bar, and
   the ground bus bars of the plurality of Y-capacitors are separately provided and the ground holes of the ground bus bars are disposed so as to face each other in a first direction.

2. The capacitor module according to claim 1, wherein in the plurality of Y-capacitors, the first capacitor elements of the respective Y-capacitors are disposed so as to be adjacent to each other, and the second capacitor elements of the respective Y-capacitors are disposed so as to be adjacent to each other.

3. The capacitor module according to claim 2, wherein at least one of the ground holes of the ground bus bars is disposed at the same side as the first and second high voltage input terminals, and the capacitor elements are disposed along the first direction.

4. The capacitor module according to claim 3, wherein the ground holes of the ground bus bars disposed at the same side as the first and second high voltage input terminals are disposed so as to be adjacent to the high voltage input terminals.

5. The capacitor module according to claim 2, wherein in the plurality of Y-capacitors, a path from the first high voltage input terminal to the ground hole of the ground bus bar via the first capacitor element and a path from the second high voltage input terminal to the ground hole of the ground bus bar via the second capacitor element are the same as each other.

* * * * *